United States Patent [19]
Lim

[11] Patent Number: 5,469,302
[45] Date of Patent: Nov. 21, 1995

[54] ELECTROSTRICTIVE MIRROR ACTUATOR FOR USE IN OPTICAL PROJECTION SYSTEM

[75] Inventor: Dae-Young Lim, Seoul, Rep. of Korea

[73] Assignee: Daewoo Electronics Co., Ltd., Seoul, Rep. of Korea

[21] Appl. No.: 247,127

[22] Filed: May 20, 1994

[30] Foreign Application Priority Data

May 21, 1993 [KR] Rep. of Korea .................... 1993-8858

[51] Int. Cl.$^6$ ............................ G02B 7/182; G02B 26/08; H01L 41/08
[52] U.S. Cl. ............................ 359/846; 359/224; 359/291; 359/295; 359/872; 310/328; 310/333; 310/366
[58] Field of Search ........................... 359/224, 225, 359/226, 291, 846, 849, 850, 855, 865, 872, 246, 248, 295, 323; 310/328, 331, 333, 366; 29/25.35

[56] References Cited

U.S. PATENT DOCUMENTS

| | | | |
|---|---|---|---|
| 4,248,504 | 2/1981 | Albertinetti et al. | 359/295 |
| 5,083,857 | 1/1992 | Hornbeck | 359/224 |
| 5,085,497 | 2/1992 | Um et al. | 359/848 |
| 5,159,225 | 10/1992 | Um | 310/328 |
| 5,212,582 | 5/1993 | Nelson | 359/224 |

FOREIGN PATENT DOCUMENTS

| | | | |
|---|---|---|---|
| 0232413 | 10/1986 | Japan | 359/224 |
| 0021115 | 1/1987 | Japan | 359/224 |
| 0035322 | 2/1987 | Japan | 359/224 |
| 0035321 | 2/1987 | Japan | 359/224 |
| 0085219 | 4/1987 | Japan | 359/323 |

Primary Examiner—Ricky D. Shafer
Attorney, Agent, or Firm—Anderson Kill Olick & Oshinsky

[57] ABSTRACT

An electrostrictive mirror actuator for use in an optical projection system, comprising: an active matrix substrate including a substrate, a transistor and a connecting terminal thereon; an electrostrictive actuator mounted on said active matrix substrate, including an electrostrictive member having a top and a bottom surfaces, a common signal electrode, a bias electrode and a reference electrode, wherein the top surface of the electrostrictive member is evenly separated by a trench of a fixed depth formed thereon and running across the top surface, thereby creating a first actuatig member having a first top surface and a second actuating member having a second top surface, said common signal electrode being located on the bottom surface thereof, said bias and said reference electrodes being located on the first top surface and the second top surface, respectively; a hinge provided with a flat top surface and a bottom surface having a protrusion fitted to the trench; and a mirror mounted on the flat top surface of said hinge.

3 Claims, 2 Drawing Sheets

20; # ELECTROSTRICTIVE MIRROR ACTUATOR FOR USE IN OPTICAL PROJECTION SYSTEM

FIELD OF THE INVENTION

The present invention relates to an optical projection system; and, more particularly, to an electrostrictive mirror actuator for use therein.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIG. 1, there is shown a cross sectional view of a prior art piezoelectric mirror actuator 10 used in an M×N piezoelectric actuated mirror array as disclosed in U.S. Pat. No. 5,159,225, entitled "PIEZOELECTRIC ACTUATOR", comprising a substrate 14, a mirror 12, a pair of piezoelectric members 16a, 16b and a hinge 18.

Each of the piezoelectric members 16a, 16b has a first side surface 20a, 20b, a second side surface 22a, 22b, a top surface 24a, 24b and a bottom surface 26a, 26b. The bottom surface 26a, 26b is mounted to the substrate 14. In this embodiment, the first side surface 20a, 20b of each of the piezoelectric members is in a facing relationship to each other, and the second side surface 22a, 22b is opposite therefrom.

The polarization of the piezoelectric members 16a, 16b is selected so that when a voltage is applied between their respective first side suface 20a, 20b and second side surface 22a, 22b, each member 16a, 16b will shear in a direction determined by the polarity of the voltage. By placing the first side surface 20a, 20b of each member 16a, 16b in a facing relationship, the application of an identical voltage will cause the top surface 24a, 24b of each member 16a, 16b to shear toward each other for a first polarity or shear away from each other for a second, opposite polarity of the applied voltage. Other orientations and polarizations of the piezoelectric members 16a, 16b when combined with a proper voltage and polarity applied to each member 16a, 16b are also possible.

To apply such voltage, a first metallization 28 is deposited, by employing one of the conventional techniques, to interconnect the first side surface 20a, 20b of each member 16a, 16b. Similarly, a second metallization 30 is applied to each second side surface 22a, 22b. The second metallization may be coupled to a common, ground potential. Application of the voltage to the first metallization 28 will therefore cause each piezoelectric member 16a, 16b to shear.

The hinge 18 includes a pair of mounting members 32a, 32b, a pair of translational members 34a, 34b, a rotating member 36 and a driven member 38. Each of the mounting members 32 is mounted on the top surface 24a, 24b of a respective one of the piezoelectric members 16a, 16b. The rotating member 36 is disposed between each mounting member 32a, 32b and attached thereto via each translational members 34a, 34b. More particularly, the first translational member 34a is mounted at its distal end 40a to an upper portion 42 of the rotating member 36 and the second translational member 34b is mounted at its distal end 40b to a lower portion 44 of the rotating member 36. The driven member 38 is attached to the rotating member 36 and extends radially outward from the axis of rotation.

A distal end 46 of the driven member may include a planar platfrom 48 to which the mirror 12 is mounted. The application of a voltage will cause shearing as described hereinabove to tilt the plane of the mirror 12 in response to the rotation of the rotating member 36.

An array of such actuators 10 may be constructed to be individually addressable. An opening 50 is formed, through the substrate 14, located between the pair of piezoelectric members 16a, 16b in the array of such pairs. A metallization 52 fills the hole and is in electrical contact with the first metallization 28. An addressable driver 54 mounted to the lower surface of the substrate 14 applies a voltage to the metallization 52. The voltage at each pair in the array may be developed in accodance with pixel intensity in a light modulator projection apparatus. The second metallization 30 at each second face 24a, 24b may be interconnected in common on the top surface of the substrate.

There are various problems associated with the prior art piezoelectric mirror actuator. They are: (1) since the piezoelectric material, e.g., lead zirconium titanate(PZT), exhibits a hysteresis, it is rather difficult to obtain a consistent and accurate mechanical response for a given electric signal; (2) the piezoelectric material must be poled by using a very cumbersome process; and (3) since the piezoelectric mirror actuator is manufactured using mechanical means, e.g., sawing, it is difficult to obtain the desired yield, and, furthermore, there is a limit to the down sizing thereof.

SUMMARY OF THE INVENTION

It is, therefore, a primary object of the present invention to provide an electrostrictive mirror actuator for use in an optical projection system, which does not require poling and does not exhibit a hysteresis.

It is another object of the present invention to provide an electrostrictive mirror actuator for use in an optical projection system which can be manufactured using the manufacturing technologies employed in the manufacturing of semiconductors.

In accordance with one aspect of the present invention, there is provided an electrostrictive mirror actuator for use in an optical projection system comprising:
 an active matrix substrate including a substrate, a transistor and a connecting terminal thereon;
 an electrostrictive actuator, mounted on said active matrix substrate, including an electrostrictive member having a top and a bottom surfaces, a common signal electrode, a bias electrode and a reference electrode, wherein the top surface of the electrostrictive member is evenly separated by a trench of a fixed depth formed thereon and running across the top surface, thereby creating a first actuating member having a first top surface and a second actuating member having a second top surface, said common signal electrode being located on the bottom surface thereof, said bias and said reference electrodes being located on the first top surface and the second top surface, respectively;

a hinge provided with a flat top surface and a bottom surface having a protrusion wherein said protrusion is fitted to the trench formed on the electrostrictive member; and a mirror mounted on the flat top surface of said hinge.

BRIEF DESCRIPTION OF THE DRAWINGS

The above and other objects and features of the present invention will become apparent from the following description of preferred embodiments given in conjunction with the accompanying drawings, wherein.

DETAILED DESCRIPTION OF THE PREFERRED EMBODIMENTS

Figure 1:
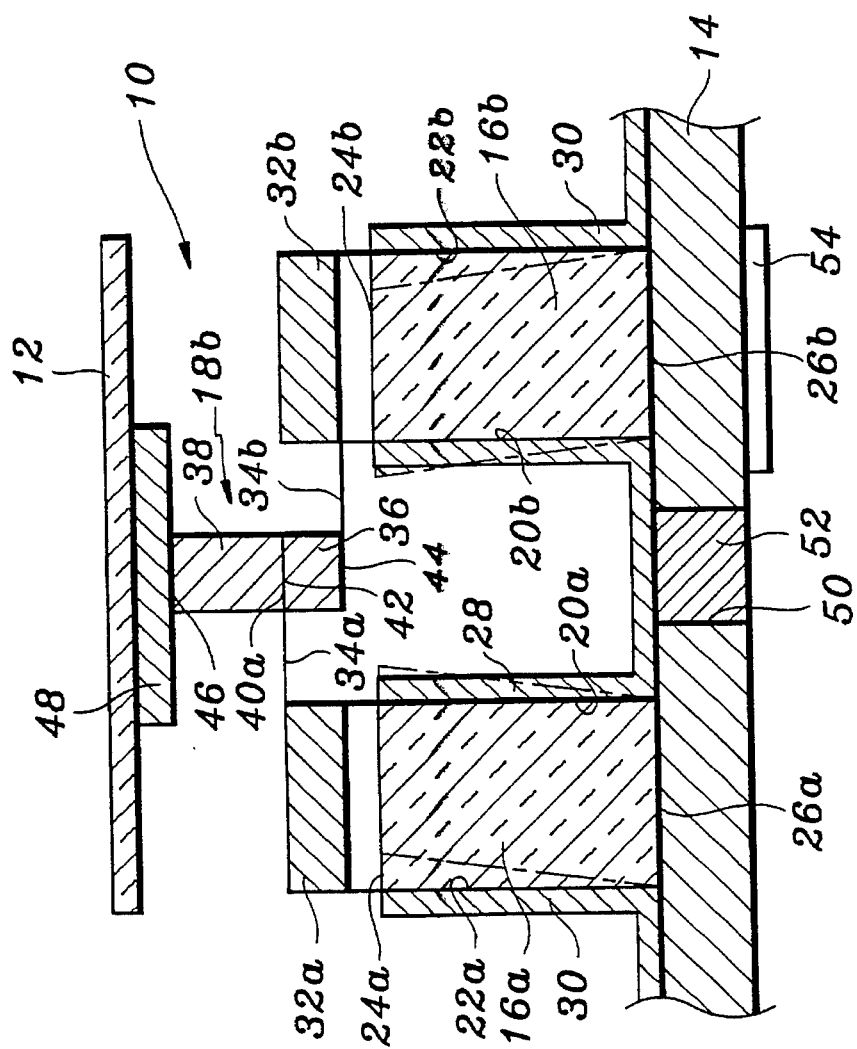
FIG. 1 shows a cross sectional view of a prior art piezoelectric mirror actuator.
Figure 2:
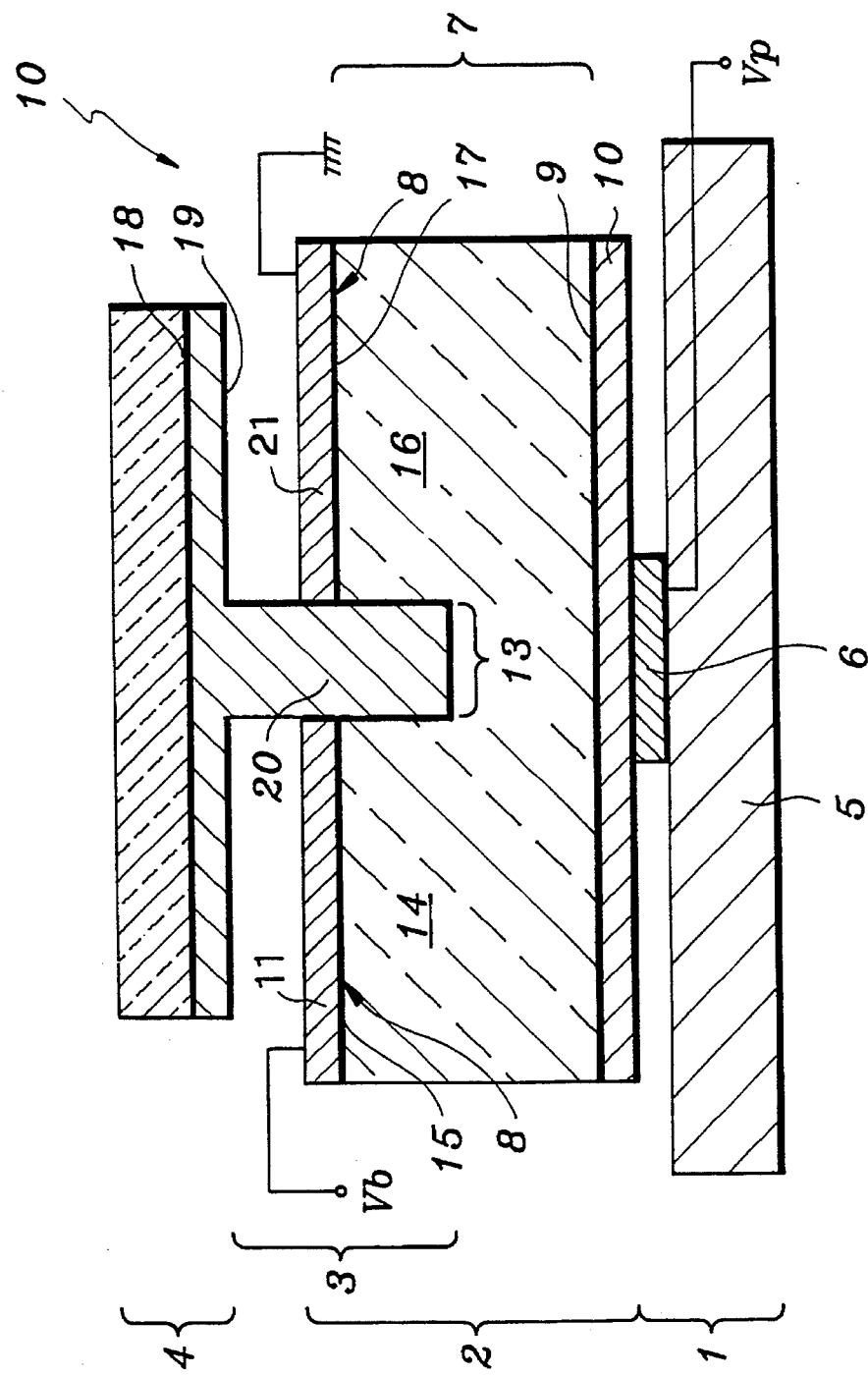
FIG. 2 illustrates a cross sectional view of an electrostrictive mirror actuator constructed in accordance with the present invention.

As shown in FIG. 2, the inventive electrostrictive mirror actuator 10 is comprised of an active matrix substrate 1, an electrostrictive actuator 2, a hinge 3, and a mirror 4.

The active matrix substrate 1 includes: a substrate 5, made of an insulating material, e.g., $Al_2O_3$, or glass, or a semiconductor, e.g., Si; a transistor(not shown); and a connecting terminal 6, made of a conductive metal, e.g., Al. The electrostrictive actuator 2, mounted on the active matrix substrate 1, is comprised of an electrostrictive member 7 having a top and a bottom surfaces 8, 9, a common signal electrode 10, a bias electrode 11 and a reference electrode 21, wherein the top surface 8 of the electrostrictive member 7 is evenly separated by a trench 13 of a fixed depth formed thereon, running across the top surface 8, thereby creating a first actuating member 14 having a first top surface 15 and a second actuating member 16 having a second top surface 17, the common signal electrode 10 is located on the bottom surface 9 thereof, the bias and the reference electrodes 11, 21 are located on the first top surface 15 and the second top surface 17, respectively.

The electrostrictive member 7 is made of, e.g., lead magnesium niobate-lead titanate(PMN-PT) and the trench 13 formed thereon is obtained using a wet etching method. Furthermore, the signal electrode 10, which is electrically connected to the connecting terminal 6, is located on the bottom surface 9 of the electrostrictive member 7 in such a way that its center line is aligned with the center line of the trench 13 and is common to the first and the second actuating members 14, 16.

The hinge 3, made of an insulating epoxy, has a top surface 18 and a bottom surface 19 provided with a protrusion 20 thereon such that the protrusion 20 can be fitted in the trench 13 formed on the electrostrictive member 7 and the mirror 4, made of a light reflecting material, e.g., Al, is mounted on the top surface 18 of the hinge 3. The mirror 4 is usually formed using a sputtering method. Further, there is disclosed in a copending, commonly assigned application, U.S. Ser. No. 08/216,755, entitled "MIRROR ARRAY AND METHOD FOR THE MANUFACTURE THEREOF", a method for attaching a mirror to an actuator.

In the electrostrictive actuator 2, a bias voltage $V_b$ of a fixed magnitude is applied to the bias electrode 11, and the reference electrode is connected to a ground potential. When a signal voltage $V_p$ is applied to the signal electrode 10, developed in accordance with, for example, the corresponding pixel intensity in an optical projection system, the etectrostrictive material in the first actuating and the second actuating members 14, 16 will deform mechanically, whose magnitude will be proportional to difference between the bias voltage $V_b$, and the signal voltage $V_p$, thereby tilting the mirror 4. The bias voltage $V_b$ must always be equal to or greater than the signal voltage $V_p$.

While the present invention has been described with respect to certain preferred embodiments only, other modifications and variations may be made without departing from the scope of the present invention as set forth in the following claims.

What is claimed is:

1. An electrostrictive mirror actuator for use in an optical projection system, comprising:

an active substrate including a substrate, a transistor and a connecting terminal thereof;

an electrostrictive actuator mounted on said active substrate, including an electrostrictive member having a top and a bottom surfaces, a common signal electrode, a bias electrode and a reference electrode, wherein the top surface of the electrostrictive member is evenly separated by a trench of a fixed depth formed thereon and running across the top surface, thereby creating a first actuating member having a first top surface and a second actuating member having a second top surface, said common signal electrode being located on the bottom surface thereof, said bias and said reference electrodes being located on the first top surface and the second top surface, respectively;

a hinge provided with a flat top surface and a bottom surface having a protrusion fitted to the trench; and a mirror mounted on the flat top surface of said hinge.

2. The electrostrictive mirror actuator of claim 1, wherein the common signal electrode is electrically connected to the connecting terminal of said active substrate matrix.

3. The electrostrictive mirror actuator of claim 1, wherein the hinge is made of an insulating epoxy.

* * * * *